(12) United States Patent
Larsson et al.

(10) Patent No.: US 12,287,310 B2
(45) Date of Patent: Apr. 29, 2025

(54) METHOD FOR CLASSIFYING A PACKAGE

(71) Applicant: Tetra Laval Holdings & Finance S.A., Pully (CH)

(72) Inventors: Mikael Larsson, Flyinge (SE); Andreas Eriksson, Löddeköpinge (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 252 days.

(21) Appl. No.: 17/792,922

(22) PCT Filed: Aug. 20, 2021

(86) PCT No.: PCT/EP2021/073194
§ 371 (c)(1),
(2) Date: Jul. 14, 2022

(87) PCT Pub. No.: WO2022/043230
PCT Pub. Date: Mar. 3, 2022

(65) Prior Publication Data
US 2023/0341304 A1 Oct. 26, 2023

(30) Foreign Application Priority Data
Aug. 25, 2020 (EP) ..................................... 20192710

(51) Int. Cl.
*G01N 3/08* (2006.01)
*B65B 25/00* (2006.01)
(Continued)

(52) U.S. Cl.
CPC ............. *G01N 3/08* (2013.01); *B65B 25/001* (2013.01); *B65B 55/00* (2013.01); *B65B 57/00* (2013.01); *G01N 3/06* (2013.01); *G01N 35/04* (2013.01)

(58) Field of Classification Search
None
See application file for complete search history.

(56) References Cited

U.S. PATENT DOCUMENTS

| 4,862,732 A * | 9/1989 | Raymond ............... G01M 3/36 |
| | | 73/49.3 |
| 2004/0035189 A1* | 2/2004 | Tsoukalas ............. G01M 3/363 |
| | | 73/49.3 |

(Continued)

FOREIGN PATENT DOCUMENTS

| EP | 1344727 A2 | 9/2003 |
| EP | 2 960 188 A1 | 12/2015 |
| WO | 2004072587 A2 | 8/2004 |

OTHER PUBLICATIONS

Extended European Search Report dated Feb. 17, 2021, for priority European Patent Application No. 20192710.0.

(Continued)

*Primary Examiner* — Patrick Assouad
*Assistant Examiner* — Mark A Shabman
(74) *Attorney, Agent, or Firm* — Renner, Otto, Boisselle & Sklar, LLP

(57) ABSTRACT

A method of classifying a package based on stiffness of the package, wherein the package includes carton and is filled with food product, the method including applying a force on the package, retrieving a sample value by measuring a deformation of the package caused by the force, determining a difference between the sample value and a reference value, and classifying the package as belonging to a first category if the difference is within a threshold interval, otherwise classifying the package as belonging to a second category.

18 Claims, 4 Drawing Sheets

(51) Int. Cl.
    *B65B 55/00*         (2006.01)
    *B65B 57/00*         (2006.01)
    *G01N 3/06*          (2006.01)
    *G01N 35/04*        (2006.01)

(56) References Cited

U.S. PATENT DOCUMENTS

| | | | |
|---|---|---|---|
| 2009/0071103 A1* | 3/2009 | Andersson | B65B 55/12 53/425 |
| 2011/0056275 A1* | 3/2011 | Calhoun | G01M 3/32 73/41 |
| 2012/0279182 A1* | 11/2012 | Barbieri | B65B 3/025 229/164 |

OTHER PUBLICATIONS

International Search Report mailed Dec. 6, 2021, for priority International Patent Application No. PCT/EP2021/073194.

* cited by examiner

METHOD FOR CLASSIFYING A PACKAGE

TECHNICAL FIELD

The invention relates to packaging technology. More particularly, it is related to methods and an apparatus for classifying packages filled with food products.

BACKGROUND ART

Today, to assure that packages holding food products have not been damaged during production different types of equipment are used to analyze the packages. By doing so, it is possible to avoid that deficient packages are distributed to retailers. One such type of equipment is a vision sensor connected to a computer for analyzing captured image data. The general principle of such equipment is that the packages are analyzed based on the captured image data such that it can be determined whether they deviate from a pre-set standard or not. In case there is a deviation, an operator can be notified to remove the deviating packages.

In addition to remove the packages, the operator often checks a packaging machine producing the packages to learn why the packages are not fulfilling the pre-set standard. If settings on the package machine is required to be changed, if a packaging material used for producing the packages is deficient, etc., this can be taken care of by the operator. Thus, having equipment, such as the vision sensor, provides for that deficient packages can be detected rapidly, which provides for that the less packages and food product are wasted.

The packages can be deficient in different ways. For instance, the packages can be deficient in that print on the packages are not provided in line with pre-set requirements, sometimes referred to as a print deficiency. The deficiency may also lie in that the packages are not shaped according to the pre-set requirements, which may be referred to as a package shape deficiency. For instance, corners and edges may be misplaced according to the pre-set requirements. Most often these deficiencies are cosmetic and do not affect a function of the packages. However, in some cases the packages are damaged or produced incorrectly such that the function of the packages is affected. In such cases, there might be a food safety deficiency. Unlike the print deficiency or the package shape deficiency, such deficiency may result in the food product becoming contaminated and, in worst case, that a person consuming the food product becomes ill.

Even though the vision sensor and other technologies that are available today detect many of the packages that in one way or the other deviate from the pre-set requirements, there are drawbacks with the technologies used today. For instance, a risk with vision sensor technology is that deficiencies that are difficult or even impossible to detect only by using the image data are not detected. On the other hand, if replacing or complementing the vision sensor with a manual assessment station, that is, one or several operators manually assess the packages, there will be problems in terms of increased costs and also in terms of consistency, since operators may classify the packages differently.

Based on the above, there is a need for methods and apparatuses that can classify the packages reliably and quickly to assure that they fulfill the pre-set requirements and that food inside the packages is safe to consume.

SUMMARY

It is an object of the invention to at least partly overcome one or more of the above-identified limitations of the prior art. In particular, it is an object to provide a reliable and cost-efficient method to classify packages filled with food products to e.g. reduce a risk that packages not fulfilling pre-set requirements are distributed to retailers or consumers. For one embodiment of the invention it is an object to provide a method that can be used for classifying packages that comprise carton and that are heat treated with steam or water during the production, to be able to distinguish packages in which water has leaked into the carton from those packages that have been able to withstand the water, that is, in which no water has leaked into the carton.

According to a first aspect it is provided a method of classifying a package based on stiffness of the package, wherein the package comprises carton and is filled with food product. The method comprises applying a force on the package, measuring a deformation of the package caused by the force, and classifying the package as belonging to a first category if the deformation is within a threshold interval, otherwise classifying the package as belonging to a second category.

An advantage with applying the force and measuring the deformation is that the package can be classified reliably. For instance, in case water has leaked into a packaging material of the package during heat treatment of the package with the food product this may prove difficult to detect by using a vision sensor arrangement, but by applying the force and measuring the deformation caused by the force this may detected reliably. This is because carton becomes softer when water leaks into it.

The deformation of the package is typically the distance by which the package deforms in response to the force. The threshold internal may be a numeric interval or some other suitable data that represents deformation that is normal for the packages that are measured and which fulfil the desired quality requirements, e.g. in term of a moisture content not exceeding a desire amount. The first category into which packages are classified may represent packages that fall within the interval, while packages being outside the interval are classified as belonging to a second category.

The force may be applied on a side panel of the package. The force may be applied on an edge portion of the package.

An advantage of applying the force close to an edge of the package is that in case water has leaked into the package, this can affect the stiffness of the package and this has proven to be noticeably reflected when applying the force and measuring deformation close to the edge.

The method may further comprise applying an opposite force on an opposite side panel of the package, wherein the step of measuring the deformation is performed by measuring the deformation of the package caused by the force and the opposite force.

An advantage of applying forces from two sides is that the package is held in place and not pushed away, thereby providing for improved classification.

The method may further comprise conveying the package, wherein the step of applying the force on the package may be performed in parallel with the step of conveying the package, such that the force may be applied along the side panel of the package, in the direction by which the package is conveyed.

The step of applying the force may be performed by pressing a first roll against the package as the package is conveyed past the first roll.

An advantage of using the first roll in this way is that the classification can be made while conveying the package, which provides for an improved speed of the classification.

The package may be formed as a rectangular cuboid, and the step of pressing the first roll against package as the package is conveyed past the first roll may be performed by pressing the first roll over a front edge portion of the package, pressing the first roll over a mid-portion of the side panel, and pressing the first roll over a rear edge portion of the package, wherein the front edge portion may comprise a front edge where the side panel joins a front panel, and the rear edge portion may comprise a rear edge where the side panel joins a rear panel.

The step of measuring the deformation of the package caused by the force may be performed during the step of pressing the first roll against the front edge portion and/or the step of pressing the first roll against the rear edge portion as the package is conveyed past the first roll.

The threshold interval may be determined based on the deformation measured for previously classified packages classified as belonging to the first category.

The force may be applied on an area of the package that is less than 3 cm². The area is determined as the area on which the force is applied at a given movement in time (momentary area). This corresponds the area when the package is still, i.e. it is not the area over which the force is applied along the package (accumulated area).

According to a second aspect it is provided a method for producing packages filled with food product, said method comprising packing the food product in the packages, wherein the packages comprise carton material, heat treating the packages with the food product, and classifying the packages according to the first aspect.

According to a third aspect it is provided an apparatus for classifying a package based on stiffness of the package, said apparatus comprising a conveyor system arranged to engage with a bottom of the package and to transport the package to an assessment area (AA), a first arm arranged to apply a force on the package, wherein the first arm is attached to a first shaft arranged to rotate around a first axis of rotation (AR-1), a first rotary encoder arranged to measure a first angular position of the first shaft, wherein the first angular position represents a deformation of the package, a memory holding a value representing a deformation threshold interval, and a control unit configured to retrieve said value representing a deformation threshold interval from the memory, and classify the package as belonging to a first category if the deformation is within said threshold interval, otherwise classify the package as belonging to a second category.

An end section of the first arm may be provided with a first roll and the first arm may be arranged to engage with a side panel of the package via the first roll.

The apparatus may further comprise a second arm arranged to apply an opposite force on an opposite side panel of the package.

An end section of the second arm may be provided with a second roll and the second arm may be arranged to engage with an opposing side panel of the package via the second roll.

The first arm may be attached to the first shaft arranged to rotate around the first axis of rotation, the second arm may be attached to a second shaft arranged to rotate around a second axis of rotation, and wherein the deformation may be measured by the first rotary encoder connected to the first shaft in combination with a second rotary encoder arranged to measure a second angular position of the second shaft also representing the deformation of the package.

Still other objectives, features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings, in which FIG. 1 generally illustrates an apparatus for classifying packages seen from above.

DETAILED DESCRIPTION

Figure 1:
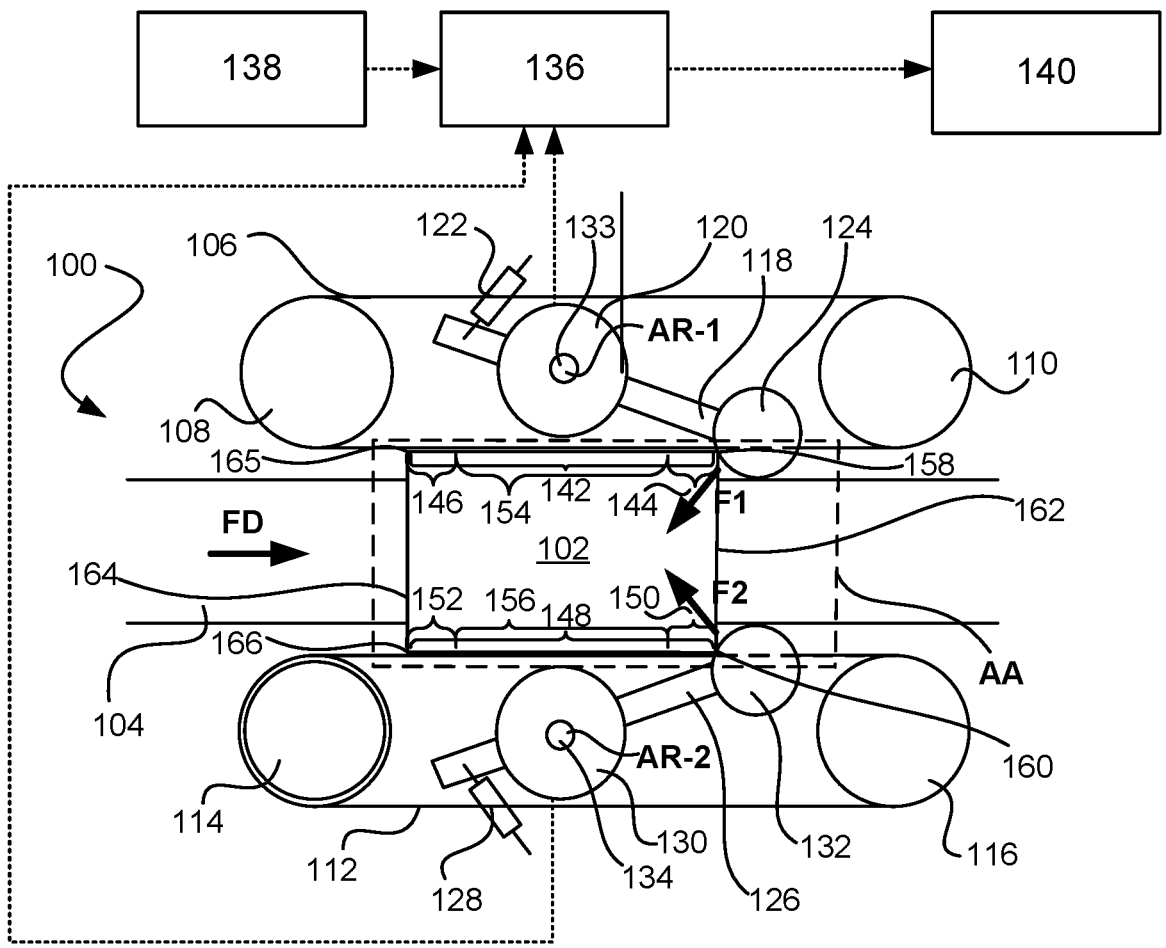

FIG. 1 illustrates an apparatus 100 for classifying a package 102 by way of example. To provide for that classification of the package 102 can be made reliably and quickly, the package 102 can be provided to the apparatus 100 via a conveyor system 104 which is arranged to convey the package 102 to an assessment area AA of the apparatus 100. As illustrated, the conveyor system 104 may be a conventional conveyor band on the package 102 is placed.

To provide for that the package 102 is held in place horizontally in the assessment area AA a first side belt 106 placed over a first side belt rear roll 108 and a first side belt front roll 110. Opposite to the first side belt 106, a second side belt 112 can be provided such that the package 102 can be held between the first and second side belt 106, 112 during the classification. The second side belt 112 can be placed over a second side belt rear roll 114 and a second side belt front roll 116. To provide for that a speed of the package 102 can be changed by using the first and second side belts 106, 112, one or several of the rolls 108, 110, 114, 116 can be driven by a motor. For instance, the second side belt rear roll 114 can be driven. An advantage of having a possibility to increase or decrease the speed of the package by using the first and second side belts 106, 112 is that a more precise speed of the package 102 can be achieved, which provides for that a more precise classification can be made. Even though it is beneficial to use side belts 106, 112, they may be omitted as they are not necessary for carrying out the classification of the packages.

To classify the package 102, when being held between the first and second side belt 106, 112, a force F1 is applied via a first arm 118 onto the package 102. The force F1 will result in that a deformation of the package 102 takes place. In case the package 102 has been affected during production, e.g. in that water has leaked into packaging material of the package 102, this will be reflected in the deformation. This applies in particular if the package 102 includes cardboard or some other cellulose based material for providing stiffness to the package. As an effect, the package 102 can be classified in different categories, for instance, approved or deficient.

The deformation of the package 102 can be measured in different ways. In this example, a first rotary encoder 120 can be used for measuring an angular position of the arm 118. To provide for that the force F1 is formed a first coil spring 122 attached to the first arm 118 can be used. In order to provide for that the classification can be made while the package 102 is conveyed, a first roll 124 may be provided on a peripheral end of the first arm 118 such that the force F1 can be applied via the first roll 124.

Opposite to the first arm 118, a second arm 126 may be provided. The second arm 126 can be arranged in the same manner as the first arm 118, that is, the second arm 126 can be connected to a second coil spring 128 such that an opposite force F2 applied onto the package 102 can be formed, and a second rotary encoder 130 can be used for measuring a second angular position.

By having the force F1 and the opposite force F2, forces are applied onto the package 102 on two sides. Having two forces applied on two sides reduce a risk that the package 102 is pushed away, which in turn provides for that more reliable classifications based on stiffness of the package 102 can be made. Put differently, the package 102 is pressed between the first and second rolls 124, 132, thereby providing for that the stiffness of the package 102 can be measured accurately.

As illustrated, the force F1 and the opposite force F2 do not have to be directly opposite to each other. For instance, when applying the force F1 and the opposite force F2 by using the first and second rolls 124, 132, respectively, directions of the two forces can vary as the package 102 is conveyed past the first and second arms 124, 132. For instance, as illustrated, when applying the force and the opposite force F1, F2 onto the package 102 in an early phase of a process of measuring deformation of the package 102, the forces F1, F2 are directed more towards as a center of the package 102 and not towards each other. In a subsequent phase, when the package 102 has been conveyed further such that first and second rolls 124, 132 are applied onto mid-sections of the package 102, that is, non-edge sections, the two forces F1, F2 may however be directed towards each other, transverse to the feeding direction FD by which the package 102 is conveyed.

The first arm 118 and the first rotary encoder 120 may be arranged around a first shaft 133 and in this way rotate around a first axis of rotation AR-1. Similarly, the second arm 126 and the second rotary encoder 130 may be arranged around a second shaft 134 and in this way rotate around a second axis of rotation AR-2, as illustrated. This is one out of several possible arrangements. Another possibility is to have the first and second arms 118, 124 connected to linear motors.

The measured deformation, which may be the first and second angular positions captured by the first and second rotary encoder 120, 130, respectively, may be transmitted to a control unit 130. Even though illustrated as a direct communication between the first and second rotary encoders 120, 130, the measured deformation may also or alternatively be transmitted via other devices and/or other systems.

In a control unit 136, the deformation can be compared to a reference value, which can be retrieved from a memory 138, provided internally or externally with respect to the control unit 136. In case the measured deformation is within a threshold interval, the package 102 may be classified as belonging to a first category. Otherwise, that is, if the difference is outside the threshold interval, the package is classified as belonging to a second category.

The threshold interval may be a mean value of previously measured deformations on packages determined to be in the first category, combined with a tolerance value surrounding the mean value. This interval value may be based on measurements made with the apparatus 100 itself or measurements made on similar apparatuses placed elsewhere. Since different package types have different properties, e.g. different types of packages can differ in size and in packaging material, different intervals may be used for different types of packages. Thus, to provide for that the interval is matching the type of the package 102, input to the control unit 136 regarding the type of the package 102 may be made, e.g. by having a printed mark corresponding to the type of package printed on the package 102, or by that an operator manually providing this information.

The threshold interval may be based on a variance determined based on the previously measured deformations. For instance, the threshold interval may be determined as a threshold factor multiplied by a standard deviation. The second category typically represents deficient packages and the first category represents approved packages.

In case the first category represents approved packages and the second category represents deficient packages, control data may be transmitted from the control unit 136 to a sorting device 140, which may be placed downstream the apparatus 100. Based on the control data provided by the control unit 136, the sorting device 140 can remove the deficient packages from the conveyor system 104.

As illustrated, the package 102 can have a rectangular cross section. For instance, the package 102 may be a brick-shaped package, also referred to a rectangular cuboid. The package 102 can be made of different materials. For instance, the package 102 may comprise carton material. To protect a carton layer from the food product held in the package 102, an inner plastic layer may be provided on the carton layer at the inside of the package 102. To protect the carton layer and a printed surface of the package 102, an outer plastic layer may be provided on the carton layer at the outside of the package 102. In addition, an aluminum layer may be provided between the carton layer and the inner plastic layer to shield the food. For instance, the package 102 may be the commercially available Tetra Recart package, marketed and sold by Tetra Pak.

The package 102 may be fed in the feeding direction FD into the apparatus 100. The sides of the package 102 that are facing the first and second belts 106, 112 are herein referred to as a side panel 142, which in turn can comprise a front edge portion 144 and a rear edge portion 146, and an opposite side panel 148, which in turn can comprise an opposite front edge portion 150 and an opposite rear edge portion 152. The front edge portion 144, the rear edge portion 146, the opposite front edge portion 150 and the opposite rear edge portion 152 may be sections of particular relevance to measure when to detect if water has leaked into the packaging material. One reason for this is that the stiffness in these sections can be more affected than a mid-section 154 of the side panel 142 or an opposite mid-section 156 of the opposite side panel 148. The package has also a front panel 162 and a rear panel 164. The illustrated package 102 has two front edges 158, 160 and two rear edges 165, 166.

As illustrated, the side panel 142 may be a main panel of the package, that is, a panel that is intended to face consumers in retailer stores. Sometimes, this main panel is referred to as the front panel, but herein the panels are named with the respect to the feeding direction FD.

Further, even though it is illustrated to have the main panel and its opposite panel, i.e. the side panel 142 and the opposite side panel 148, facing the first and second side belts 106, 112, the package 102 may also be fed into the apparatus 100 with the main panel, herein the side panel 142, facing the feeding direction FD. However, having the largest panels facing the first and second rolls 124, 132 may result in that the stiffness of the package being be measured in a more reliable manner.

Figure 2:
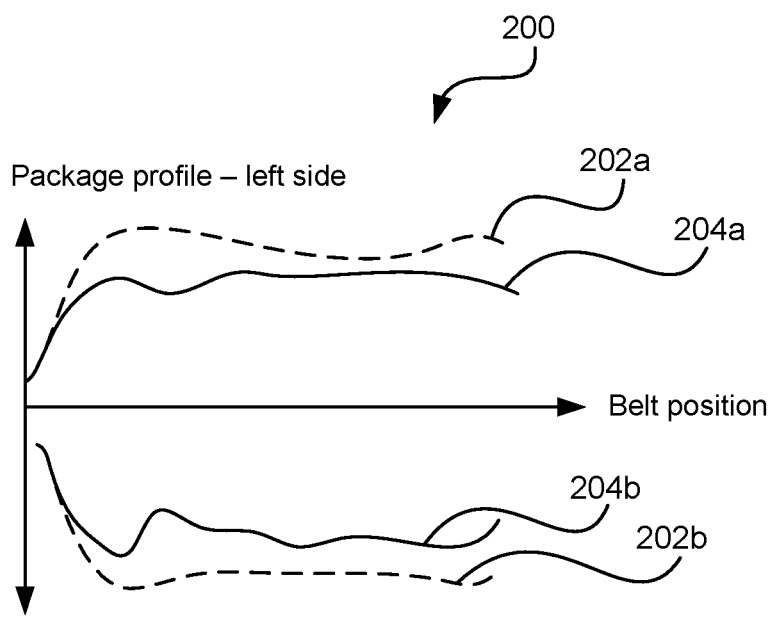
FIG. 2 is a chart with graphs illustrating a package profile.

FIG. 2 is a chart 200 that illustrates by way of example a first reference graph 202a representing the desired deformation interval associated with the measurements made with respect to the first side panel 142 of the package, and a second reference graph 202b representing the desired deformation interval associated with the measurements made with respect to the second side panel 148. Further, it is illustrated a first sample graph 204a representing the measured deformation associated with the first side panel 142, and a second sample graph 204b representing the measured deformation associated with the second side panel 148.

As indicated on a vertical axis and a horizontal axis of the chart, the graphs 202a, 202b, 204a, 204b can be seen as a package width (when force applied on the package) as a function of a belt position. As described above, the force F1 can be applied in different ways and the deformation (change in width) can be measured in different ways as well, and as an effect this is hence one of several possibilities on how to define and represent the measured deformation and the desired deformation interval.

As illustrated, the first and second sample graphs 204a, 204b deviate from the first and second reference graphs 202a, 202b, which indicates that the package 102 that is classified may have been affected by for instance water or steam used during production. For instance, in case the package 102 is filled with product, closed and thereafter pressure-cooked in a retort, there is a risk that water has leaked into the packaging material when the package 102 was placed in the retort.

Worth pointing out is that deviations between the first and second sample graphs 204a, 204b and the first and second reference graphs 202a, 202b are most distinguishable in a beginning, that is, when the front edge portions and the opposite front edge portions 144, 150 of the package 102 are being subjected to the force F1 and the opposite force F2, respectively.

Figure 3:
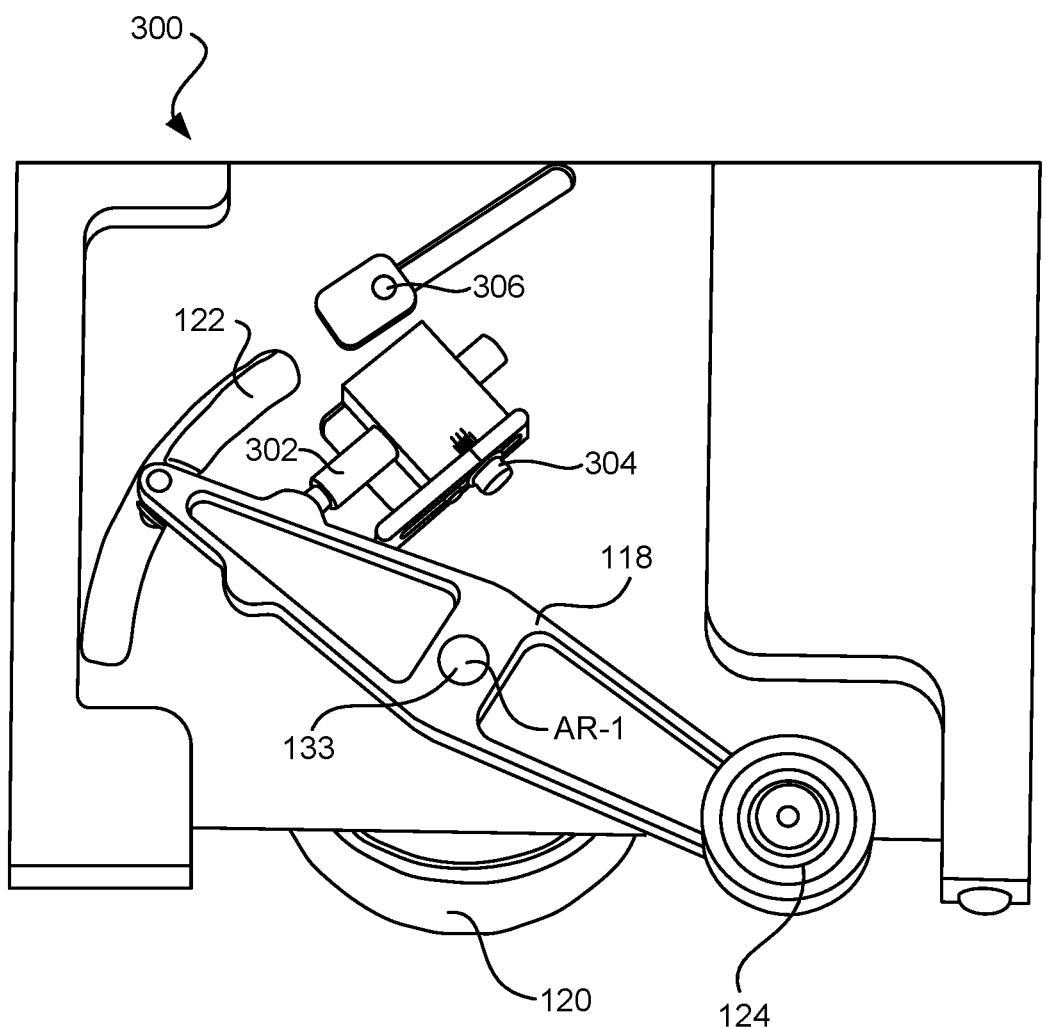
FIG. 3 illustrates a first arm of the apparatus in further detail.

FIG. 3 illustrates a unit 300 comprising the first arm 118 that can be attached to the apparatus 100 by way of example. In line with the description above referring to FIG. 1, the first arm 118 may be provided with the first roll 124 and the first rotary encoder 120. Further, the first arm 118 may be rotatably attached to the first shaft 133 such that the two can rotate around the first rotational axis AR-1. In addition, the coil spring 122 can be attached to the first arm 118 such that the force F1 can be obtained.

To provide for that movement of the first arm 118 is less affected by disturbances caused by e.g. irregularities in different parts of the apparatus 100, a damper 302 may be connected to the first arm 118. By having the damper 302, the measured deformation may be less affected by noise, which provides for that the classification can be made in a more reliable manner.

To adjust the damper 302, a damper adjustment screw 304 can be provided. In a similar manner, a spring coil adjustment device 306 can be provided such that the spring coil 122 and thereby the applied force can be adjusted.

Figure 4:
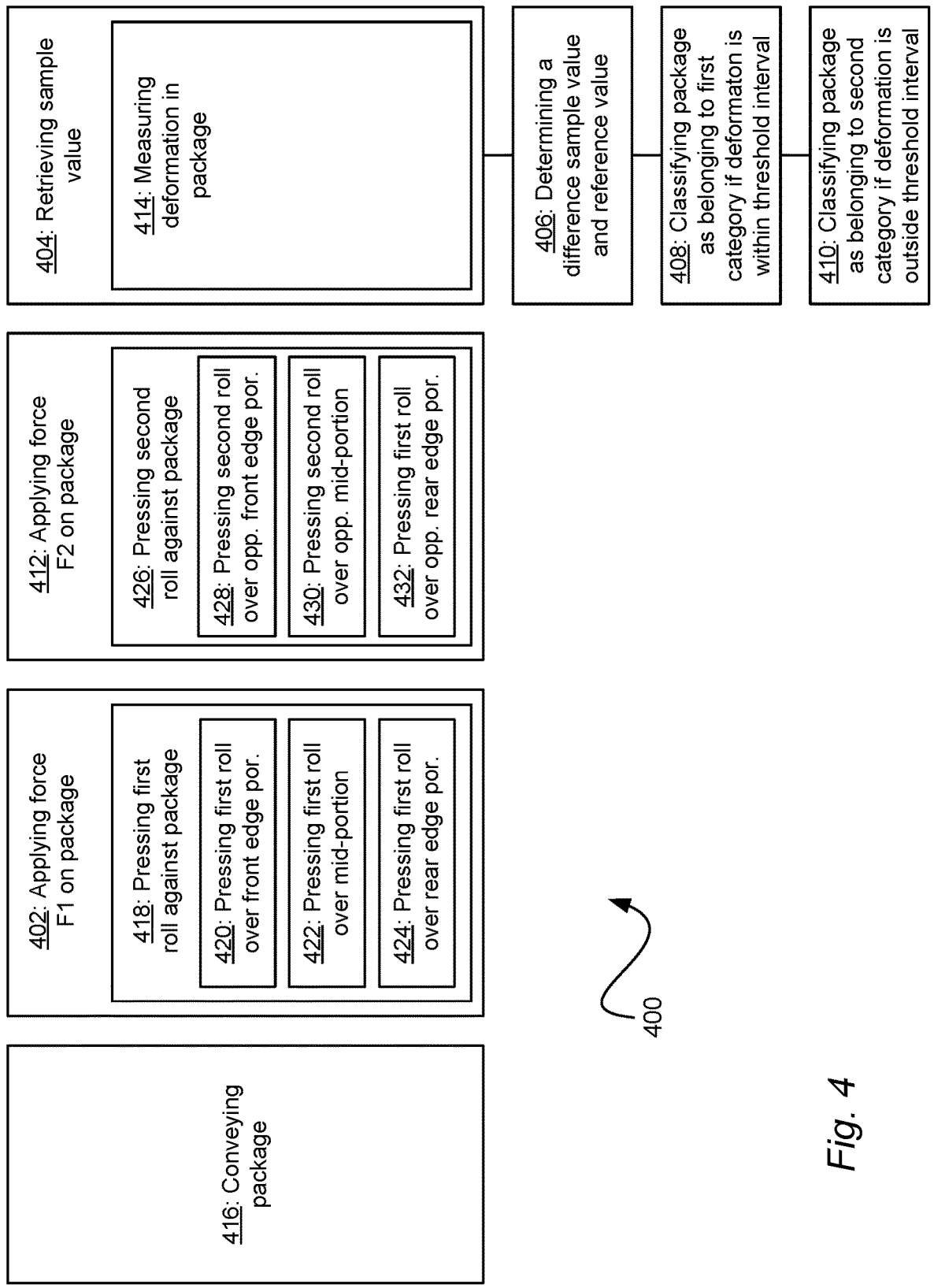
FIG. 4 is a flow-chart illustrating a method for classifying packages.

FIG. 4 is a flowchart 400 that illustrates a method for classifying the package 102 based on stiffness. Even though steps are referred to in numerical order, this should not be understood as that these have to performed in a particular order, unless explicitly stated otherwise.

In a first step 402 the force F1 is applied onto the package 102. As explained above, this can be made in different ways, e.g. by using the apparatus 100 illustrated in FIG. 1.

In a second step 404, a sample value can be retrieved. This can be performed by using the first and the second rotary encoders 120, 130 as illustrated in FIG. 1 by way of example. As illustrated, this step may be performed in parallel with the first step 402. The sample value is obtained by the encoders 120, 130 which measure the rotation of the arms 118, 126. The rotation of the arms 118, 126 is dependent on how much the rolls 124, 132 are pressed into the package 102, i.e. the rotation is dependent on how much the package 102 is deformed. Thus, retrieving the sample value 404 may comprise measuring the deformation of the package 102.

If the measurement is expressed as the deformation in form of how much the corners 158, 160, front or back edges portions 144, 150, 146, 152 and/or the side panels 142, 148 are pressed towards each other, then the deformation may be numerically calculated by determining how much the rolls move "into" the package 102 in the direction parallel to the front and rear panels 162, 164. The movement "into" the package 102 can be calculated by using conventional geometric and trigonometric functions.

In a third step 406, it is determined if the measured deformation (sample value) is within the desired interval (reference value), which may be retrieved from the memory 138. Turning back to FIG. 2, the measured deformation may look like the sample graph 204a. The desired interval may look like the reference graph 202a. The reference graph 202a may include a tolerance value that defines an interval around the illustrated graph. The tolerance may be, for example ±10% of the reference value.

Thereafter, in a fourth step 408, the package 102 can be classified as belonging to the first category if the difference is within the threshold interval. Taking the graphs of FIG. 2 as an example, the package 102 is classified as belonging to the first category if the sample graphs 204a is within ±10% of the reference graph 202a.

In a fifth step 410, which may be performed in parallel to the fourth step 408, the package 102 can be classified as belonging to the second category if the difference is outside the threshold interval. Taking the graphs of FIG. 2 as an example, the package 102 is classified as belonging to the second category if the sample graph 204a is outside±10% of the reference graphs 202a.

As explained above, the first category can represent approved packages, that is, the package 102 is fulfilling pre-set requirements, and the second category can represent deficient packages, that is, the package 102 is not fulfilling pre-set requirements.

Optionally, in a sixth step 412, the opposite force F2 can be applied onto the package 102. As explained above, the opposite force F2 does not necessarily have to be directly opposite to the force F1, but it should instead be interpreted as that the opposite force F2 is interacting with an opposite side of the package 102. As illustrated, this sixth step 412 may be performed in parallel with the first and second steps 402, 404.

The second step 404 may include a seventh step 414 of measuring the deformation of the package 102. The deformation measurement may be performed as explained above.

Additionally, the second step may include classifying the package 102 as belonging to the first category only of the deformation caused by the opposite force F2 is also within a threshold interval. Using the deformation and interval illustrated by FIG. 2, this means that sample graph 204b, representing deformation caused by the opposite force F2, must be within ±10% of reference graph 202b, which represents the threshold interval for the deformation caused by the opposite force F2.

In an eighth step 416, the package 102 may be conveyed. Conveying the package 102 may be achieved by using the conveyor system 104 and/or the first and second side belts 106, 112. As illustrated, this step may be performed in parallel with the first, second and sixth steps 402, 404, 412.

In a ninth step 418, which can be considered a sub-step of the first step 402, the force F1 may be applied by that the first roll 124 is pressed against the package 102. This sub-step may in turn comprise a tenth step 420 in which the first roll 124 can be pressed over the front edge portion 144 of the package, an eleventh step 422 in which the first roll 124 can be pressed over the mid-portion 152 of the side panel 142 of the package 102, and a twelfth step 424 in which the first roll 124 can be pressed over the rear edge portion 146.

In a similar manner, in a thirteenth step 426, which may be considered a sub-step of the sixth step 412, the opposite force F2 may be applied by that the second roll 132 can be pressed against package 102. This sub-step may in turn comprise a fourteenth step 428 in which the second roll 132 can be pressed over the opposite front edge portion 150 of the package, a fifteenth step 430 in which the second roll 132 can be pressed over the opposite mid-portion 154 of the opposite side panel 148 of the package 102, and a sixteenth step 432 in which the second roll 132 can be pressed over the opposite rear edge portion 152.

Figure 5:
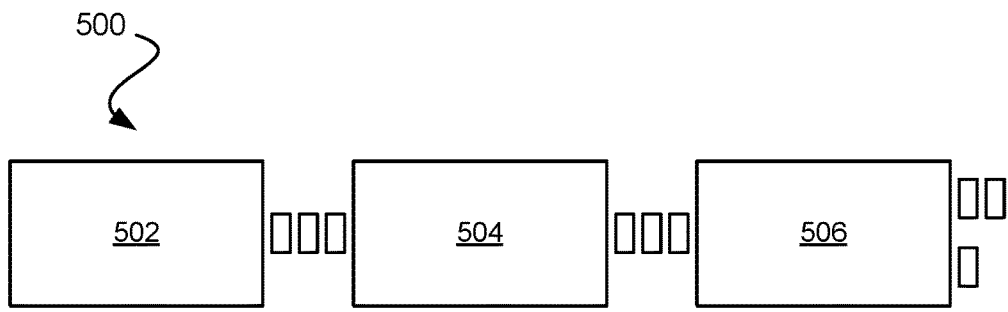
FIG. 5 illustrates a system for producing the packages filled with food product.

FIG. 5 illustrates a system 500 for producing the packages 102 filled with food products. The system comprises a filling machine 502, also referred to as packaging machine, in which the packages 102 can be formed and filled with the food product. After being filled with the food product, the packages 102 can be fed to a heat treatment station 504. This may be a retort in which the packages 102 filled with the food product is heated under sub-atmospheric pressure such that a shelf life of 24 months or more can be achieved. The heat treatment station 504 may also be a pasteurizer in which the packages 102 can be heated such that unwanted microorganisms are killed off. The filling machine 502 and the heat treatment station 504 can be any conventional and suitable filling machine respectively heat treatment station. After the heat treatment station 504, the packages 102 can be transferred to a package classifier 506, that may comprise the apparatus 100 illustrated in FIG. 1. In the package classifier 506, the packages 102 can be classified into different categories. For instance, the packages 102 can be classified as belonging to the first or the second category as explained above, or if considered beneficial classified into more than two different categories depending on deformation.

Figure 6:
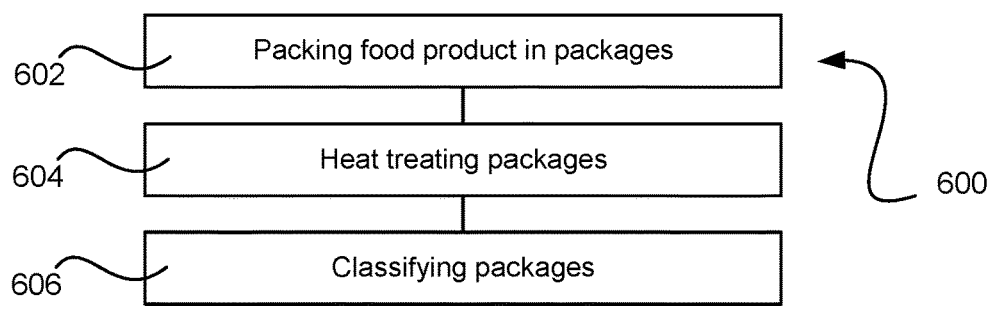
FIG. 6 is a flow-chart illustrating a method for producing the packages filled with the food product.

FIG. 6 is a flowchart illustrating a method 600 for producing the packages 102 filled with the food product. In a first step 602, the food product can be packed into the packages 102. This step may be performed by using the filling machine 502 illustrated in FIG. 5.

In a second step 604, the packages 102 can be heat treated e.g. by using the heat treatment station 504 described above and illustrated in FIG. 5. Subjecting the packages to heat can be made in different ways. For instance, steam or hot water may be used. This may be accomplished by spraying steam or hot water from nozzles, directly on the packages and/or in a space surrounding the packages. Such spraying may be done by using a conventional retort, autoclave or another suitable apparatus that is capable of subjecting the packages to heat that comes from steam or hot water. It may also be made in sub-atmospheric pressure if e.g. a retorting device is used. If not using the retorting device as the heat treatment station, a pasteurizer may be used. In case the packages comprise carton, it is a risk with using steam or hot water that water leaks into the packaging material.

In a third step 606, the packages can be classified into two or more categories by using e.g. the package classifier 506 illustrated in FIG. 5 and/or the principles presented above. For instance, in this step, the packages in which water has leaked into the packaging material can be distinguished from the packages in which no leakage have occurred.

Figure 7:
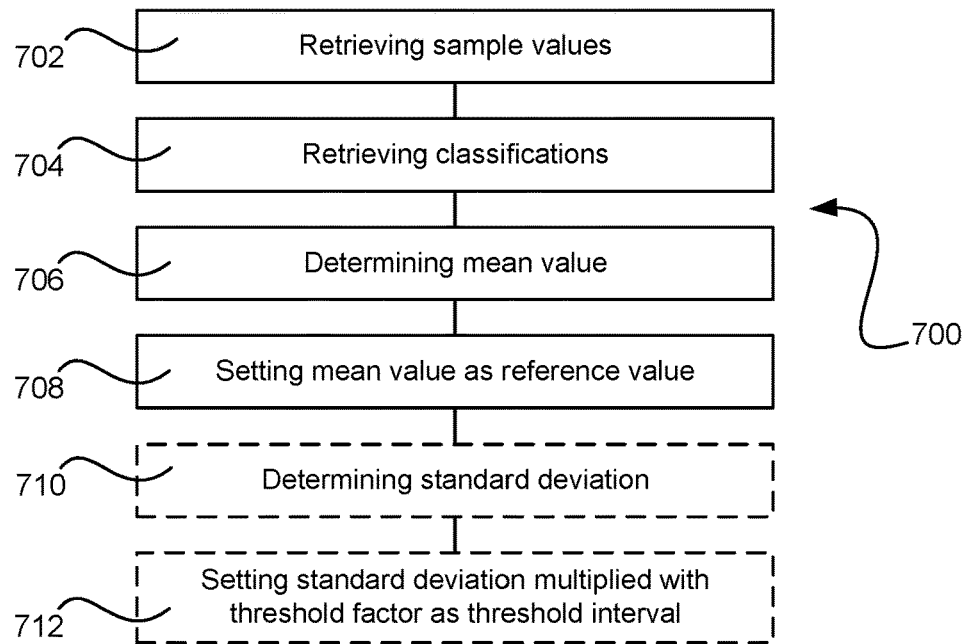
FIG. 7 is a flow-chart illustrating a method for creating a reference value.

FIG. 7 is a flow-chart illustrating a method 700 for creating the threshold interval (reference value) that is used for classifying the packages.

In a first step 702, the values representing the deformation (sample values) can be retrieved by measuring a plurality of deformations of the packages 102 caused by the forces F1. The sample values can continuously be retrieved as the packages 102 are classified by e.g. the apparatus 100 illustrated in FIG. 1. An advantage of having the sample values from many packages is that noise related to individual measurements has less impact.

In a second step 704, classifications related to the packages 102 can be retrieved. By having the classifications, that is, to which category different packages have been determined to belong, it is possible to link the sample values to different categories. As explained above, the classifications can be the first category, which may represent approved packages, and the second category, which may represent deficient packages.

In a third step 706, a mean value can be determined. The mean value can be based on the deformations of the packages belonging to the first category.

In a fourth step 708, the reference value may be set to the mean value.

Optionally, to determine the threshold interval, in a fifth step 710, a standard deviation may be determined based on the deformations of the packages belonging to the first category. Then, in a sixth step 712, the threshold interval may be set to the standard deviation multiplied by a threshold factor, which may be 4 or more generally 2 to 6.

Even though normal distribution is presumed in the steps presented above, other types of distributions may also be applicable, and thus the methods and apparatuses presented above should not be understood to be restricted to normal distribution.

As previously indicated and in line with the flow chart illustrated in FIG. 4, the method 400 of classifying the package 102 based on stiffness of the package 102, wherein the package 102 comprises carton and is filled with food product may comprise applying 402 a force F1 on the package 102, retrieving 404 the sample value by measuring 414 the deformation of the package 102 caused by the force F1, determining 406 the difference 408 between the sample value and a reference value, and classifying 408 the package 102 as belonging to the first category, e.g. approved, if the difference is within the threshold interval, otherwise classifying 410 the package 102 as belonging to the second category, e.g. deficient.

The method may further comprise conveying the package 102 by using the conveyor system 104 to the assessment area AA, wherein the bottom of the package 102 engages with the conveyor system 104, and holding the package 102 in the assessment area AA by using the first side belt 106 and the second side belt 112, wherein the first side panel of the package 102 engages with the first side belt 106 and the second side panel of the package 102 engages with the second side belt 112.

The force F1 may be applied by the first arm 118 onto the first side panel of the package 102.

The end section of the first arm 118 may be provided with the first roll 124 such that the first arm 118 engages with the package 102 via the first roll 124.

The first arm 118 may be attached to the first shaft 133 arranged to rotate around the first axis of rotation AR-1, and the sample value may be measured by the first rotary encoder 120 arranged to measure a first angular position of the first shaft 133.

The first arm may be provided with the damper 302. Even though not illustrated, an opposite damper may be provided to the second arm 126.

The force F1 may be applied by the first arm 118 onto the first side panel of the package 102 and by the second arm 126 onto the second panel of the package 102.

The end section of the second arm 126 may be provided with the second roll 132 such that the second arm 124 engages with the package 102 via the second roll 132.

The first arm 118 may be attached to the first shaft 133 arranged to rotate around the first axis of rotation AR-1, the second arm 126 may be attached to the second shaft 134 arranged to rotate around the second axis of rotation AR-2, and the sample value may be measured by the first rotary encoder 120 connected to the first shaft 133 in combination with the second rotary encoder 130 arranged to measure a second angular position of the second shaft 134.

Further, it may be provided an apparatus for assessing the package 102 based on stiffness of the package 102, said apparatus comprising the conveyor system 104 arranged to engage with the bottom of the package 102 and to transport the package 102 to the assessment area AA, the first arm 118 arranged to apply the force F1 onto the package 102, wherein the first arm is attached to the first shaft 133 arranged to rotate around the first axis of rotation AR-1, the first rotary encoder 120 arranged to measure the sample value by measuring the first angular position of the first shaft 133, the memory 138 holding the reference value, and the control unit 136 configured to retrieve the reference value from the memory 138, compare the sample value with the reference value, and if a match is found, assign the package 102 as belonging to the first category, e.g. approved, else assign the package 102 as belonging to the second category, e.g. deficient.

The end section of the first arm 118 may be provided with the first roll 124 and the first arm 118 may be arranged to engage with the package 102 via the first roll 124.

The end section of the second arm 126 may be provided with a second roll 132 and the second arm 126 may be arranged to engage with the package 102 via the second roll 132.

The first arm may be attached to the first shaft 133 arranged to rotate around the first axis of rotation AR-1, the second arm 126 may be attached to the second shaft 134 arranged to rotate around the second axis of rotation AR-2, and wherein the sample value may be measured by the first rotary encoder 120 connected to the first shaft 133 in combination with the second rotary encoder 130 arranged to measure a second angular position of the second shaft 134.

From the description above follows that, although various embodiments of the invention have been described and shown, the invention is not restricted thereto, but may also be embodied in other ways within the scope of the subject-matter defined in the following claims.

The invention claimed is:

1. A method of classifying a package based on stiffness of the package, wherein the package is made of a carton material and is filled with food product, said method comprises
applying a force on the package,
measuring a deformation of the package caused by the force,
detecting packages that have had water leak into the carton material based on the deformation, and
classifying the package as belonging to a first category if the deformation is within a threshold interval, otherwise classifying the package as belonging to a second category, to thereby distinguish packages in which water has leaked into the carton material from those packages that have been able to withstand the water;
wherein the carton material includes a cellulose based material which becomes softer when water leaks into the carton material to result in the deformation.

2. The method according to claim 1, wherein the force is applied on a side panel of the package.

3. The method according to claim 2, wherein the force is applied on an edge portion of the package.

4. The method according to claim 2, comprising
applying an opposite force on an opposite side panel of the package,
wherein the step of measuring the deformation is performed by measuring the deformation of the package caused by the force and the opposite force.

5. The method according to claim 1, comprising
conveying the package,
wherein the step of applying the force on the package is performed in parallel with the step of conveying the package, such that the force is applied along the side panel of the package, in the direction by which the package is conveyed.

6. The method according to claim 5, wherein the step of applying the force is performed by pressing a first roll against the package as the package is conveyed past the first roll.

7. The method according to claim 6, wherein the package is formed as a rectangular cuboid, and the step of pressing the first roll against package as the package is conveyed past the first roll is performed by
pressing the first roll over a front edge portion of the package,
pressing the first roll over a mid-portion of the side panel, and
pressing the first roll over a rear edge portion of the package,
wherein the front edge portion comprises a front edge where the side panel joins a front panel, and the rear edge portion comprises a rear edge where the side panel joins a rear panel.

8. The method according to claim 7, wherein the step of measuring the deformation of the package caused by the force is performed during the step of pressing the first roll against the front edge portion and/or the step of pressing the first roll against the rear edge portion as the package is conveyed past the first roll.

9. The method according to claim 1, wherein the threshold interval is determined based on the deformation measured for previously classified packages classified as belonging to the first category.

10. The method according to claim 1, wherein the force is applied on an area of the package that is less than 3 cm$^2$.

11. A method for producing packages filled with food product, said method comprising
    packing the food product in the packages, wherein the packages comprises carton material,
    heat treating the packages with the food product by subjecting the packages to steam or hot water, and
    classifying the packages according to claim 1.

12. The apparatus according to claim 11, wherein an end section of the first arm is provided with a first roll and the first arm is arranged to engage with a side panel of the package via the first roll.

13. The apparatus according to claim 11, comprising
    a second arm arranged to apply an opposite force on an opposite side panel of the package.

14. The apparatus according to claim 13, wherein an end section of the second arm is provided with a second roll and the second arm is arranged to engage with an opposing side panel of the package via the second roll.

15. The apparatus according to claim 13, wherein the first arm is attached to the first shaft arranged to rotate around the first axis of rotation, the second arm is attached to a second shaft arranged to rotate around a second axis of rotation, and wherein the deformation is measured by the first rotary encoder connected to the first shaft in combination with a second rotary encoder arranged to measure a second angular position of the second shaft also representing the deformation of the package.

16. The method according to claim 1, wherein the package further comprises a front panel, a rear panel, two front edges, and two rear edges.

17. An apparatus for classifying a package made of a carton material based on stiffness of the package, said apparatus comprising
    a conveyor system arranged to engage with a bottom of the package and to transport the package to an assessment area,
    a first arm arranged to apply a force on the package, wherein the first arm is attached to a first shaft arranged to rotate around a first axis of rotation,
    a first rotary encoder arranged to measure a first angular position of the first shaft, wherein the first angular position represents a deformation of the package caused by the package softening after water leaks into the carton material based on the deformation,
    a memory holding a value representing a deformation threshold interval, and
    a control unit configured to retrieve said value representing a deformation threshold interval from the memory, and classify the package as belonging to a first category if the deformation is within said threshold interval, otherwise classify the package as belonging to a second category, to thereby distinguish packages in which water has leaked into the carton material from those packages that have been able to withstand the water,
    wherein the carton material includes a cellulose based material which becomes softer when water leaks into the carton material to result in the deformation.

18. The apparatus according to claim 17, wherein the package further comprises a front panel, a rear panel, two front edges, and two rear edges.

\* \* \* \* \*